United States Patent
Fujishiro (10) Patent No.: US 9,965,955 B2
(45) Date of Patent: May 8, 2018

(54) DRIVE SUPPORT APPARATUS

(71) Applicant: TOYOTA JIDOSHA KABUSHIKI KAISHA, Toyota-shi (JP)

(72) Inventor: Ryo Fujishiro, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/195,047

(22) Filed: Jun. 28, 2016

(65) Prior Publication Data
US 2016/0304090 A1 Oct. 20, 2016

Related U.S. Application Data

(62) Division of application No. 14/008,804, filed as application No. PCT/JP2011/060188 on Apr. 26, 2011, now Pat. No. 9,478,135.

(51) Int. Cl.
*G08G 1/16* (2006.01)
*B60T 7/22* (2006.01)
(Continued)

(52) U.S. Cl.
CPC ............... *G08G 1/16* (2013.01); *B60T 7/22* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS 6,433,679 B1 * 8/2002 Schmid .............. B60Q 9/007
340/435
6,443,679 B1 8/2002 Schmid
(Continued)

FOREIGN PATENT DOCUMENTS

JP 6 87119 12/1994
JP H08-150910 6/1996
(Continued)

OTHER PUBLICATIONS

Notice of Allowance dated Jun. 14, 2016 in co-pending U.S. Appl. No. 14/008,804.
(Continued)

*Primary Examiner* — Krishnan Ramesh
(74) *Attorney, Agent, or Firm* — Oblon, McClelland, Maier & Neustadt, L.L.P.

(57) ABSTRACT

To improve traveling safety of a vehicle by continuing an alarm after the end of a crash prevention control for preventing a crash between an own vehicle and a target object, a drive support apparatus of the invention detects the target object which exists in a predetermined detection area ahead of the own vehicle, starts to issue an alarm with an alarm generating part to a driver of the own vehicle if probability of a crash between the own vehicle and the target object is greater than a predetermined value, start a crash prevention control in which an automatic driving operation is performed for preventing the crash with the target object, and continues to issue the alarm until a predetermined timing (timing when the driver of the own vehicle performs a predetermined driving operation, for example) after the crash prevention control by the crash prevention controlling part has been ended.

11 Claims, 4 Drawing Sheets

(51) Int. Cl.
*B60W 50/10* (2012.01)
*B60W 50/14* (2012.01)
*B60W 10/18* (2012.01)
*B60W 10/20* (2006.01)
*B60W 30/09* (2012.01)

(52) U.S. Cl.
CPC ............ *B60W 30/09* (2013.01); *B60W 50/10* (2013.01); *B60W 50/14* (2013.01); *G08G 1/165* (2013.01); *G08G 1/166* (2013.01); *B60W 2050/143* (2013.01); *B60W 2550/10* (2013.01)

(56) References Cited

U.S. PATENT DOCUMENTS

| | | | |
|---|---|---|---|
| 6,488,109 B1* | 12/2002 | Igaki | B60T 8/17557 180/169 |
| 6,583,403 B1* | 6/2003 | Koike | G01S 13/931 250/221 |
| 7,719,410 B2 | 5/2010 | Labuhn et al. | |
| 2004/0085197 A1* | 5/2004 | Watanabe | B60T 7/22 340/435 |
| 2006/0097570 A1* | 5/2006 | Doerr | B60Q 1/44 303/193 |
| 2007/0050114 A1 | 3/2007 | Koike et al. | |
| 2008/0167781 A1* | 7/2008 | Labuhn | B60W 30/08 701/48 |
| 2009/0069952 A1* | 3/2009 | Kikuchi | G01S 13/931 701/1 |
| 2010/0030474 A1 | 2/2010 | Sawada | |
| 2010/0049413 A1* | 2/2010 | Makino | B60R 1/00 701/65 |
| 2010/0114490 A1* | 5/2010 | Becker | B60W 30/16 701/301 |
| 2013/0110372 A1* | 5/2013 | Groult | B62D 15/029 701/70 |
| 2013/0282252 A1* | 10/2013 | Takagi | B60T 7/22 701/70 |
| 2013/0297173 A1* | 11/2013 | Takagi | G01S 13/862 701/70 |

FOREIGN PATENT DOCUMENTS

| | | |
|---|---|---|
| JP | 2001-171497 | 6/2001 |
| JP | 2003-030796 | 1/2003 |
| JP | 2005-14683 A | 1/2005 |
| JP | 2005 47383 | 2/2005 |
| JP | 2006 293539 | 10/2006 |
| JP | 2007-008203 | 1/2007 |
| JP | 2007 091207 | 4/2007 |
| JP | 2008-257350 | 10/2008 |
| JP | 2010 030513 | 2/2010 |

OTHER PUBLICATIONS

International Search Report dated Jun. 14, 2011 in PCT/JP11/060188 Filed Apr. 26, 2011.

\* cited by examiner

DRIVE SUPPORT APPARATUS

CROSS-REFERENCE TO RELATED APPLICATIONS

This application is a continuation of and claims the benefit of priority of U.S. Ser. No. 14/008,804, filed Sep. 30, 2013, which is the national stage of PCT/JP11/60188, filed Apr. 26, 2011, the contents of both of which are incorporated herein by reference.

TECHNICAL FIELD

The present invention is related to a drive support apparatus. In particular, the present invention is related to a drive support apparatus suited for issuing an alarm for a driver of an own vehicle if there is probability of a crash between the own vehicle and a target object which exists in a predetermined detection area ahead of the own vehicle, and performing a crash prevention control in which an automatic driving operation is performed for preventing the crash.

BACKGROUND ART

A drive support apparatus is known which detects a target object around an own vehicle to issue an alarm to a driver of the own vehicle and perform a crash prevention control such as automatic braking of the own vehicle (see Patent Document 1, for example). According to such a drive support apparatus, the alarm is issued to the driver if a crash risk value with respect to the detected target object is greater than a first predetermined value, and the crash prevention control such as automatic braking of the own vehicle is performed if the crash risk value is greater than a second predetermined value which is greater than the first predetermined value.

[Patent Document 1] Japanese Laid-open Patent Publication No. 2010-030513

DISCLOSURE OF INVENTION

Problem to be Solved by Invention

Such a crash prevention control as describe above is started if the crash risk with respect to the target object becomes high, and, after that, is ended if the crash risk with respect to the target object is reduced to a predetermined value. Further, after the crash prevention control is ended, the vehicle starts to travel due to a creep torque if the driver does not perform a brake operation. Further, if a distance between the own vehicle and the target object is substantially small at the end of the automatic braking of the vehicle, there may be a case where a vehicle-mounted sensor cannot detect the target object. Thus, according to a configuration in which the alarm is ended simultaneously at the end of the automatic braking, even if the vehicle starts to travel with the creep torque after the end of the automatic braking, the vehicle-mounted sensor cannot detect the target object because the vehicle becomes too close to the target object, which could result in a case where an alarm for urging the driver to perform the brake operation is not issued. Therefore, according to the configuration, traveling safety of a vehicle might be reduced.

The present invention is made in consideration of the matters described above, and an object of the invention is to provide a drive support apparatus which enables continuing an alarm after the end of a crash prevention control for preventing a crash between an own vehicle and a target object, thereby improving traveling safety of a vehicle.

Means to Solve the Problem

The object described above is achieved by a drive support apparatus which includes a target object detecting part configured to detect a target object which exists in a predetermined detection area ahead of an own vehicle; an alarm controlling part configured to start to issue an alarm with an alarm generating part to a driver of the own vehicle if probability of a crash between the own vehicle and the target object detected by the target object detecting part is greater than a predetermined value; and a crash prevention controlling part configured to start a crash prevention control in which an automatic driving operation is performed for preventing the crash with the target object, wherein the alarm controlling part continues to issue the alarm until a predetermined timing after the crash prevention control by the crash prevention controlling part has been ended.

Advantage of the Invention

According to the present invention, it becomes possible to continue an alarm after the end of a crash prevention control for preventing a crash between an own vehicle and a target object, thereby improving traveling safety of a vehicle.

DESCRIPTION OF REFERENCE SYMBOLS 10 drive support apparatus
12 PCS-ECU
14 vehicle speed sensor
14 back-and-forth acceleration sensor
16 forward sensor
18 accelerator pedal sensor
22 brake pedal sensor
24 meter ECU
26 buzzer ECU
28 brake ECU

BEST MODE FOR CARRYING OUT THE INVENTION

In the following, concrete embodiments of the drive support apparatus according the present invention will be described in detail by referring to the accompanying drawings.

Figure 1:
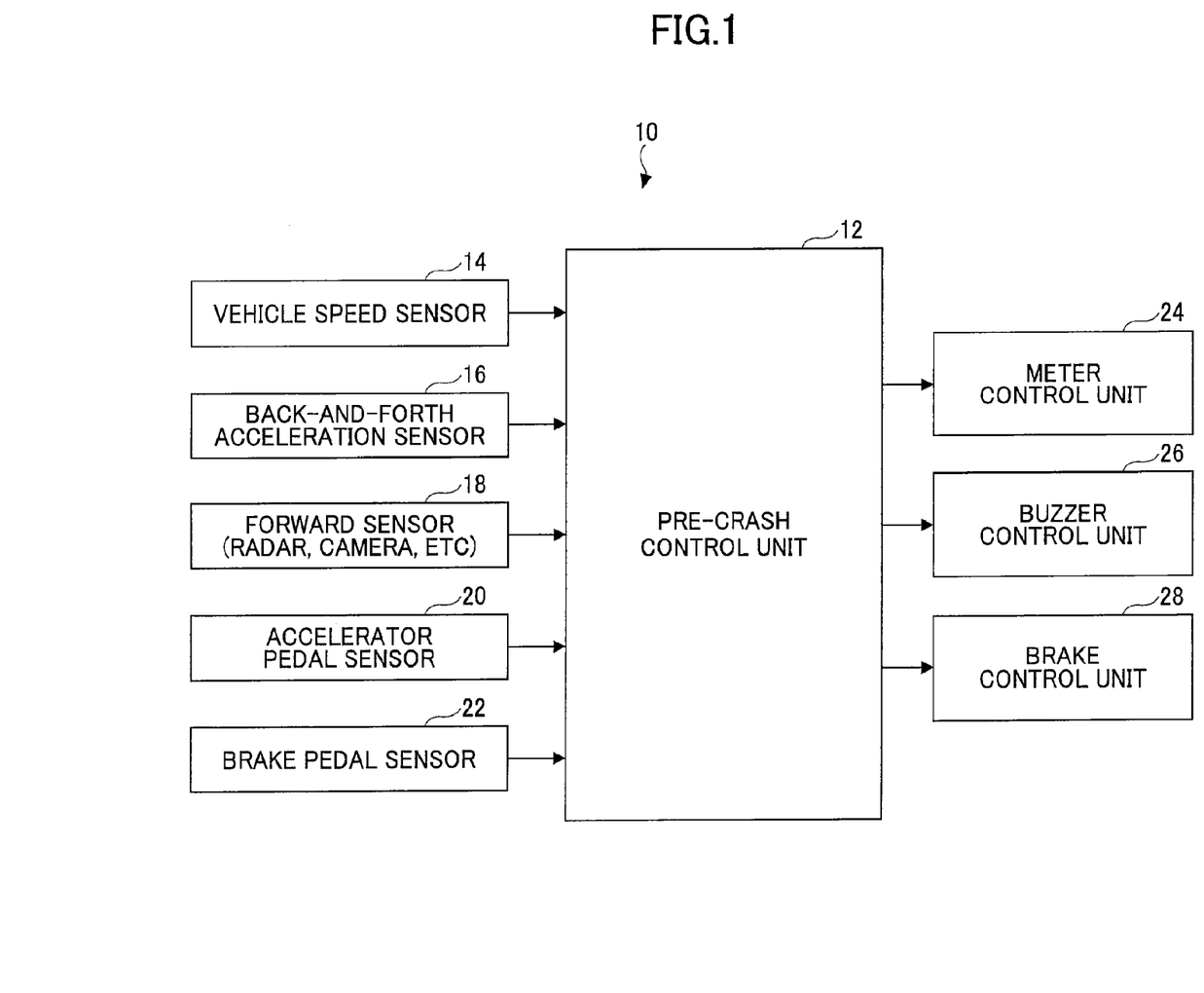
FIG. 1 is a diagram for illustrating a configuration of a drive support apparatus according an embodiment of the present invention.
Figure 2:
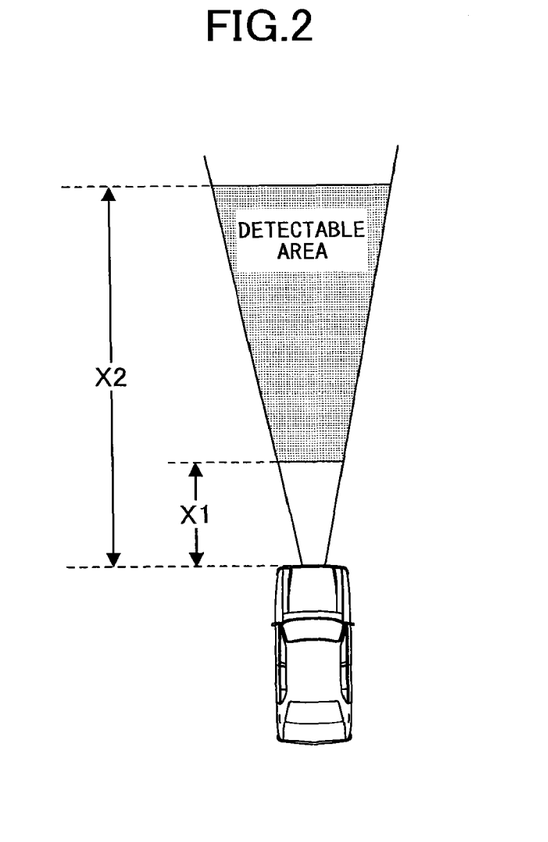
FIG. 2 is a diagram for illustrating an area for which a forward sensor of the drive support apparatus according the embodiment can detect a target object.

FIG. 1 is a diagram for illustrating a configuration of a drive support apparatus 10 according to an embodiment of the present invention. Further, FIG. 2 is a diagram for illustrating an area for which a forward sensor of the drive support apparatus 10 according the embodiment can detect a target object. The drive support apparatus 10 according the embodiment is installed in a vehicle, and detects a target object (another vehicle, a pedestrian, or an obstacle such as a guard rail and a side wall), which exists ahead of the own vehicle, to perform a drive support for a driver for preventing a crash between the own vehicle and the target object.

The drive support apparatus 10 includes a pre-crash control unit (referred to as PCS-ECU, hereinafter) 12 which mainly includes a microcomputer. The PCS-ECU 12 executes processes for performing the drive support for the driver so as to prevent a crash between the own vehicle and the target object. To the PCS-ECU 12 are electrically connected a vehicle speed sensor 14, a back-and-forth acceleration sensor 16, a forward sensor 18, an accelerator pedal sensor 20 and a brake pedal sensor 22.

The vehicle speed sensor 14 outputs a signal according to a vehicle speed of the own vehicle. The back-and-forth acceleration sensor 16 outputs a signal according to acceleration in a back-and-forth direction of the own vehicle. The output signal of the vehicle speed sensor 14 and the output signal of the back-and-forth acceleration sensor 16 are supplied to the PCS-ECU 12. The PCS-ECU 12 detects the vehicle speed of the own vehicle based on the output signal supplied from the vehicle speed sensor 14 and detects the back-and-forth acceleration of the own vehicle based on the output signal supplied from the back-and-forth acceleration sensor 16.

The forward sensor 18 is provided in a front bumper, a front grille of the own vehicle, a back mirror stay in a cabin, etc., and includes a radar apparatus for emitting electric or laser waves toward a forward scene of the own vehicle or a camera for capturing the forward scene of the own vehicle. It is noted that the radar apparatus may emit a millimeter wave or a laser, and the camera may be of a stereo type. The radar apparatus as the forward sensor 18 emits the millimeter wave or the laser toward a predetermined detection area, and receives the millimeter wave or the laser reflected at the target object which exists in the predetermined detection area to output signals according to a relative distance, a relative speed and relative acceleration between the own vehicle and the target object. The camera as the forward sensor 18 processes the captured images to extract the target object which exists in the predetermined detection area, and outputs signals according to a relative distance, a relative speed and relative acceleration between the own vehicle and the target object.

The predetermined detection area in which the forward sensor 18 is capable of detecting the target object is from a position away from a front nose of the own vehicle by a first predetermined distance (1 m, for example) to a position away from the own vehicle by a second predetermined distance (200 m, for example), as illustrated in FIG. 2. The output signals of the forward sensor 18 are supplied to the PCS-ECU 12. The PCS-ECU 12 detects the relative distance, the relative speed and the relative acceleration between the own vehicle and the target object based on the output signal from the forward sensor 18. Then, the PCS-ECU 12 calculates probability of a crash between the own vehicle and the target object based on the detected sensor information.

The accelerator pedal sensor 20 outputs a signal according to whether the driver of the own vehicle operates an accelerator pedal which is to be operated when the driver wants to accelerate the own vehicle. The brake pedal sensor 22 outputs a signal according to whether the driver of the own vehicle operates a brake pedal which is to be operated when the driver wants to brake the own vehicle. The output signal of the accelerator pedal sensor 20 and the output signal of the brake pedal sensor 22 are supplied to the PCS-ECU 12. The PCS-ECU 12 determines whether the driver of the own vehicle has operated the accelerator pedal based on the output signal supplied from the accelerator pedal sensor 20, and determines whether the driver of the own vehicle has operated the brake pedal based on the output signal supplied from the brake pedal sensor 22.

To the PCS-ECU 12 are electrically connected a meter control unit (referred to as a meter ECU, hereinafter) 24, a buzzer control unit (referred to as a buzzer ECU, hereinafter) 26 and a brake control unit (referred to as a brake ECU, hereinafter) 28. If the crash probability between the own vehicle and the target object, which is calculated based on the detection results of the sensors 14 through 18 described above, becomes higher than a predetermined value, the PCS-ECU 12 outputs drive instructions to the meter ECU 24, the buzzer ECU 26 and the brake ECU 28.

To the meter ECU 24 is electrically connected a meter (a combination meter, for example) as an alarm device which is provided in the cabin such that the driver of the own vehicle can see it. The meter ECU 24 is capable of controlling a display status in the meter according to the instruction from the PCS-ECU 12. To the buzzer ECU 26 is electrically connected a buzzer as an alarm device which is provided in the cabin such that the driver of the own vehicle can hear its sound. The meter ECU 26 is capable of performing a buzzer sounding process according to the instruction from the PCS-ECU 12. To the brake ECU 28 are electrically connected brake actuators for braking the own vehicle. The brake ECU 28 can brake the vehicle by driving the brake actuators according to the instruction from the PCS-ECU 12.

Figure 3:
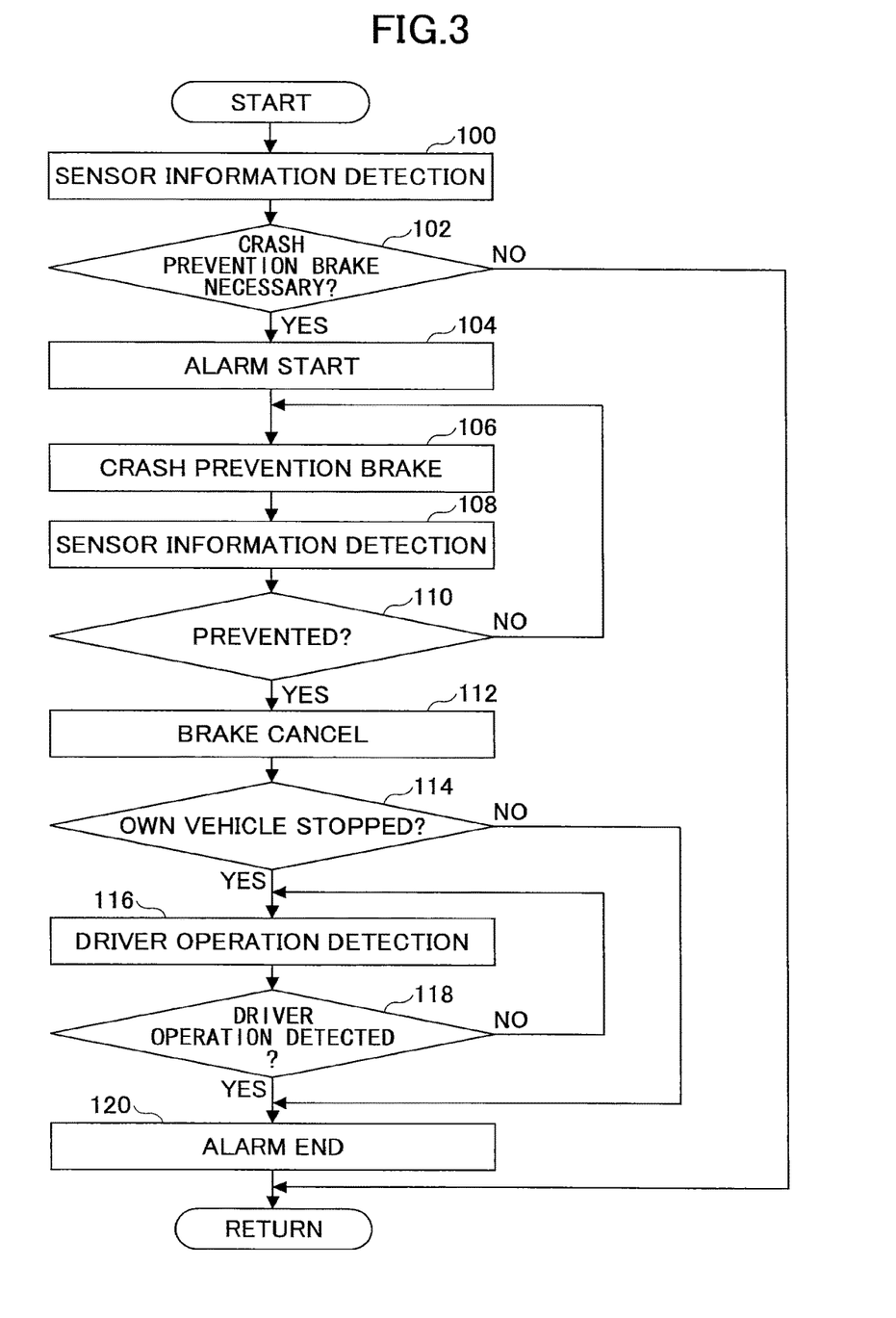
FIG. 3 is a flowchart for illustrating an example of a control routine executed by the drive support apparatus according the embodiment.

Next, with reference to FIG. 3, operations of the drive support apparatus 10 according to the embodiment are described. FIG. 3 is a flowchart for illustrating an example of a control routine executed by the PCS-ECU 12 of the drive support apparatus 10 according the embodiment.

According to the embodiment, when the drive support apparatus 10 is initiated after an ignition switch of the own vehicle is turned on, the respective elements of the drive support apparatus are powered on. After having been powered on, the PCS-ECU 12 detects the target object, which exists in the predetermined detection area ahead of the own vehicle, to execute a process for the drive support for the driver of the own vehicle. Specifically, at first, the PCS-ECU 12 detects, based on the output signals supplied from the vehicle speed sensor 14, the back-and-forth acceleration sensor 16 and the forward sensor 18, sensor information which includes the vehicle speed and the back-and-forth acceleration of the own vehicle, the relative distance, the relative speed and the relative acceleration between the own vehicle and the target object.

The PCS-ECU 12 calculates the probability of the crash between the own vehicle and the target object, which exists in a predetermined detection area ahead of the own vehicle, based on the sensor information detected in step 100. Then, the PCS-ECU determines whether the calculated crash probability is greater than the predetermined value (step 102). It is noted that the predetermined value is a reference value at which it is determined that it is necessary to brake the own vehicle in order to prevent the crash between the own vehicle and the target object. If the crash probability is not greater than the predetermined value, such as a situation where there is no target object in the predetermined detection area ahead of the own vehicle, for example, or the vehicle speed of the own vehicle becomes less than or equal to the speed of the target object even though the target object exists in the predetermined detection area, then the process routine at this cycle ends without executing any further process.

On the other hand, if the PCS-ECU 12 determines that the crash probability is greater than the predetermined value, the PCS-ECU 12 determines that it is necessary to brake the own vehicle to prevent the crash, and then executes a process for starting to issue an alarm to the driver of the own vehicle (step 104) as well as a process for starting an automatic braking control for automatically braking the own vehicle as a crash prevention control in which an automatic driving operation is performed for preventing the crash with the target object (step 106). Specifically, the PCS-ECU 12 outputs drive instructions to the meter ECU 24, the buzzer ECU 26 and the brake ECU 28.

When such drive instructions are output, a visual alarm for urging the driver of the own vehicle to perform the brake operation is implemented by a predetermined display in the meter displayed in response to the instruction from the meter ECU 24. Further, an acoustic (audio) alarm for urging the driver of the own vehicle to perform the brake operation is implemented by a buzzer sounded in response to the instruction from the buzzer ECU 26. Further, the automatic braking of the own vehicle is implemented by the brake actuators driven in response to the instruction from the brake ECU 28.

If the alarm with the display or the buzzer sounding is started and the automatic braking of the own vehicle is started, then again the PCS-ECU 12 detects, based on the output signals supplied from the vehicle speed sensor 14, the back-and-forth acceleration sensor 16 and the forward sensor 18, sensor information which includes the vehicle speed and the back-and-forth acceleration of the own vehicle, the relative distance, the relative speed and the relative acceleration between the own vehicle and the target object (step 108).

The PCS-ECU 12 determines, based on the sensor information, whether the crash between the own vehicle and the target object is prevented (step 110). It is noted that the determination whether the crash is prevented is performed by determining whether the own vehicle is stopped based on the vehicle speed sensor 14, determining whether the vehicle speed of the own vehicle is less than or equal to the speed of the target object, or determining whether the target object previously detected has gone out of the predetermined detection area (due to the steering operation by the driver, for example), for example. If it is determined that the crash between the own vehicle and the target object is not prevented yet, such as a case where the own vehicle is not stopped yet, the vehicle speed of the own vehicle exceeds the speed of the target object, or the target object previously detected still exists in the predetermined detection area, etc., the process after step 106 is executed.

On the other hand, if it is determined that the crash between the own vehicle and the target object is prevented, such as a case where the own vehicle is in the stopped status, the vehicle speed of the own vehicle is less than or equal to the speed of the target object, or the target object previously detected does not exist in the predetermined detection area, etc., the PCS-ECU 12 cancels the automatic braking of the own vehicle with the brake actuators (step 112). Specifically, the PCS-ECU 12 outputs a drive stop instruction to the brake ECU 28. When such a drive stop instruction is output, the automatic braking of the own vehicle is canceled as a result of the fact that the drive of the brake actuators is stopped by a stop instruction from the brake ECU 28. If the automatic braking of the own vehicle is canceled, then the vehicle can travel by an inertia or a creep torque as well as the driving operation by the driver.

The PCS-ECU 12 determines whether the own vehicle is in the stopped status at the time of canceling the automatic braking of the own vehicle (step 114). As a result of this, if the PCS-ECU 1 determines that the own vehicle is in the stopped status, then the PCS-ECU 1 determines whether the driver of the own vehicle has operated or is operating the accelerator pedal based on the output signals from the accelerator pedal sensor 20 as well as whether the driver of the own vehicle has operated or is operating the brake pedal based on the output signals from the brake pedal sensor 22. As a result of this, if it is determined that the driver of the own vehicle operates neither the accelerator pedal nor the brake pedal (NO in step 118), then the process after step 116 is performed.

On the other hand, if the PCS-ECU 12 determines that the driver has operated the accelerator pedal or the brake pedal after canceling the automatic braking, or determines that the driver was operating the accelerator pedal or the brake pedal at the time of canceling the automatic braking (YES in step 118), the PCS-ECU 12 executes a process for ending the alarm for the driver, determining that the traveling of the own vehicle is controlled according to the intention of the driver. Specifically, the PCS-ECU 12 outputs the drive stop instructions to the meter ECU 24 and the buzzer ECU 26. If the drive stop instructions are thus output, the alarm for stimulating a visual sense of the driver is ended as a result of the fact that the predetermined display in the meter is stopped by the stop instruction from the meter ECU 24, and the alarm for stimulating an auditory sense of the driver is ended as a result of the fact that the buzzer sounding is stopped by the stop instruction from the buzzer ECU 26.

In this way, according to the drive support apparatus 10 of the embodiment, the forward sensor 18 detects the target object which exists in the predetermined detection area ahead of the own vehicle in which the forward sensor 18 is capable of detecting the target object, and if the probability of the crash between the own vehicle and the target object becomes greater than the predetermined value, the alarm is issued to the driver of the own vehicle with the display or the buzzer and the automatic braking of the own vehicle with the brake actuators is performed.

Issuing the alarm to the driver may urge the driver to perform the brake operation or the steering operation of the own vehicle so as to prevent the crash with respect to the target object. Further, performing the automatic braking of the own vehicle may reduce the impact at the time of the crash between the own vehicle and the target object. Thus, according to the embodiment, when the probability of the crash between the own vehicle and the target object becomes high, the drive support apparatus 10 can perform the drive support for the driver for preventing the crash.

Further, according to the drive support apparatus 10 of the embodiment, after the drive support by the alarm and the automatic braking is started for preventing the crash between the own vehicle and the target object, if it is determined that the crash is prevented, then the timing at which the automatic braking is canceled can be different from the timing at which the alarm is stopped. Specifically, if it is determined that the crash between the own vehicle and the target object is prevented, the automatic braking of own vehicle is canceled immediately, while the alarm is stopped when the driver of the own vehicle has performed the operation of the accelerator pedal or the brake pedal at or after the time of the crash being prevented (i.e., at or after the time of canceling the automatic braking).

According to such a configuration, if the crash between the own vehicle and the target object is prevented, it is possible to immediately cancel the automatic braking of own vehicle, then (after the time of canceling) continue to output the alarm until the timing at which the driver of the own vehicle performs the operation of the accelerator pedal or the brake pedal, and end the alarm at that timing. In other word, even though the automatic braking of own vehicle is canceled due to the fact the crash between the own vehicle and the target object is prevented, the alarm for the driver of the own vehicle is continued by the timing at which the driver of the own vehicle performs the operation of the accelerator pedal or the brake pedal.

Therefore, according to the embodiment, even when the own vehicle starts to travel due to the creep torque after the automatic braking of own vehicle is canceled, the alarm for the driver of the own vehicle is continuously operated so that the driver is continuously urged to perform the brake operation. Thus, according to the drive support apparatus 10 of the embodiment, in comparison with a configuration in which the automatic braking and the alarm are canceled simultaneously, the driver is more effectively urged to perform the brake operation due to the alarm continuing after canceling the automatic braking of own vehicle, and thus the own vehicle is more likely to be braked. Therefore, it is possible to prevent the own vehicle from traveling due the creep torque to come into contact with the target object which is located ahead of the own vehicle and out of the predetermined detection area and thus is not detected by the forward sensor 18 (the target object located within the first predetermined distance X1 from the front nose of the own vehicle, for example). With this arrangement, the alarm can be continued after canceling the automatic braking of own vehicle, thereby improving the traveling safety when the driver drives the own vehicle to travel on the road.

It is noted that in the embodiment, after the crash between the own vehicle and the target object is prevented, the timing at which the automatic braking is canceled is different from the timing at which the alarm is stopped; however, it is implemented only if the own vehicle is in the stopped status at the time of canceling the automatic braking. In other words, if the own vehicle is traveling at the time of canceling the automatic braking, the alarm for the driver of the own vehicle by means of the meter display or the buzzer sounding is ended immediately.

Figure 4:
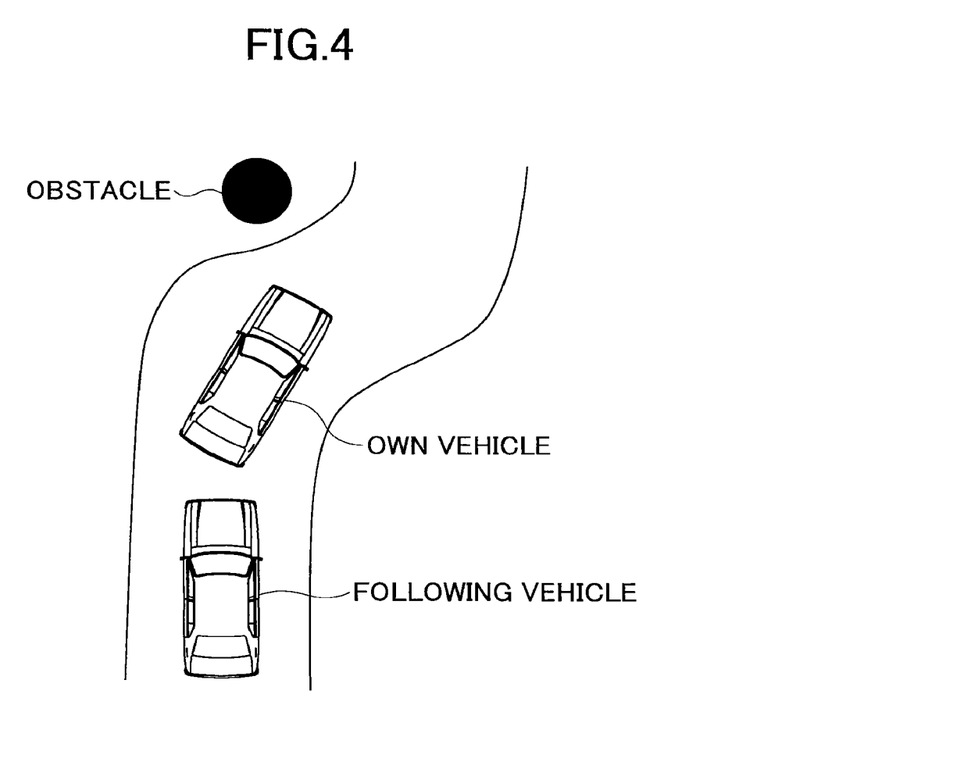
FIG. 4 is a diagram for illustrating a way of changing a sensor gain of a PCS sensor of the drive support apparatus according the embodiment.

Even in the case where the automatic braking is canceled when the crash between the own vehicle and the target object is prevented, if the own vehicle is traveling at the time of canceling the automatic braking, braking the own vehicle is not always the best vehicle operation and there is a case where steering the own vehicle is better in term of the traveling safety of the vehicle. For example, as illustrated in FIG. 4, in such a situation where an obstacle exists ahead of the own vehicle and the following vehicle is following the own vehicle, if the own vehicle is suddenly stopped due to the braking when the crash between the own vehicle and the target object can be prevented, the probability that the own vehicle is bumped into by the following vehicle becomes high. For this reason, it is not adequate to continue the alarm for urging the driver to perform the brake operation after the crash between the own vehicle and the target object is prevented.

In this connection, according to the embodiment, as described above, if the own vehicle is traveling at the time of canceling the automatic braking of own vehicle due to the fact that crash between the own vehicle and the target object is prevented, the alarm for the driver of the own vehicle with the meter display and the buzzer sounding is immediately stopped. In this way, if the own vehicle is traveling at the time of canceling the automatic braking of own vehicle, then the driver is not urged by the alarm to perform the brake operation. Thus, inducing an error in the drive operation determination of the own vehicle due to the continuation of the alarms, that is to say, urging the driver to perform the brake operation can be prevented, and unnecessary alarm can be reduced. Therefore, according to the embodiment, since the alarm is controlled in an appropriate and detailed manner according to the vehicle status at the time of canceling the automatic braking, it becomes possible to ensure the traveling safety when the driver drives the own vehicle to travel on the road.

It is noted that in the embodiments described above, the PCS-ECU 12 detecting the target object which exists in the predetermined detection area corresponds to "a target object detecting part" in claims, the meter and the buzzer correspond to "an alarm generating part" in claims, the brake operation or the accelerator operation of the driver corresponds "a predetermined driving operation" in claims, the PCS-ECU 12 executing the process of step 104 in the process routine illustrated in FIG. 3 corresponds to "an alarm controlling part" and "an alarm starting part" in claims, the PCS-ECU 12 executing the process of step 106 corresponds to "a crash prevention controlling part" and "an automatic brake starting part" in claims, the PCS-ECU 12 executing the process of step 112 corresponds to "a crash prevention controlling part" and "automatic brake canceling part" in claims, the PCS-ECU 12 executing the process of step 114 corresponds to "a traveling/stop determining part" in claims, the PCS-ECU 12 executing the process of step 118 corresponds to "a driver operation determining part" in claims, and the PCS-ECU 12 executing the process of step 120 corresponds to "an alarm controlling part" and "an alarm ending part" in claims.

It is noted that in the embodiment described above whether the crash probability between the own vehicle and the target object which exists in the predetermined detection area is greater than the predetermined value is determined based on sensor information which includes the vehicle speed and the back-and-forth acceleration of the own vehicle, the relative distance, the relative speed and the relative acceleration between the own vehicle and the target object; however, a crash prevention margin until the possible crash between the own vehicle and the target object, probability that the own vehicle is located on the same lane as the target object, etc., may be calculated, and the calculated parameters may be considered together in determining whether the crash probability is greater than the predetermined value.

Further, in the embodiment described above, the visual alarm with the meter display and the acoustic alarm with the buzzer sound are issued when the crash probability becomes greater than the predetermined value; however, one of the visual alarm and the acoustic alarm may be issued.

Further, in the embodiment described above, in order to determine whether the crash between the own vehicle and the target object is prevented, a condition that the own vehicle is stopped, a condition that the vehicle speed of the own vehicle becomes less than or equal to the speed of the target object, or a condition that the target object previously detected has gone out of the predetermined detection area is determined; however, only one or two of these three conditions may be determined.

Further, in the embodiment described above, in order to end the alarm after the crash between the own vehicle and the target object is prevented, that is to say, after the automatic braking is canceled, a condition that the driver of the own vehicle performs the accelerator operation or the brake operation is required to be met; however, only a condition that the driver of the own vehicle performs the accelerator operation may be required to be met, or only a condition that the driver of the own vehicle performs the brake operation may be required to be met. Further, a condition that the driver of the own vehicle performs a steering operation for steering the own vehicle may be required to be met in order to end the alarm.

Further, in the embodiment described above, if the crash probability between the own vehicle and the target object becomes greater than the predetermined value, the alarm to the driver of the own vehicle as well as the automatic braking of own vehicle for preventing the crash between the own vehicle and the target object are started simultaneously; however, with respect to the crash probability between the own vehicle and the target object, the condition for starting the alarm and the condition for starting the automatic braking may be different. Specifically, the conditions may be set such that the automatic braking is started after the alarm is started.

Further, in the embodiment described above, if it is determined that the crash probability between the own vehicle and the target object becomes greater than the predetermined value, it is determined that it is necessary to brake the vehicle for preventing the crash, and thus the automatic braking control is performed as the crash prevention control in which an automatic driving operation is performed for preventing the crash with the target object; however, the present invention is not limited to this. If it is determined that the crash probability between the own vehicle and the target object becomes greater than the predetermined value, and it is determined that the crash between the own vehicle and the target object can be prevented by steering the vehicle, the automatic steering control for automatically steering the own vehicle may be performed as the crash prevention control.

The invention claimed is:

1. A drive support apparatus, comprising:
   a sensor configured to detect a target object which exists in a predetermined detection area ahead of an own vehicle in a traveling direction of the own vehicle; and
   circuitry configured to:
      perform an automatic brake control to automatically brake the own vehicle by actuating brakes of the own vehicle based on a detection result of the target object by the sensor,
      issue an alarm that is related to the automatic brake control, and
      continue to issue the alarm until a predetermined timing after the automatic brake control results in a stoppage of the own vehicle without depending on whether the target object is detected by the sensor after the stoppage of the own vehicle.

2. The drive support apparatus of claim 1, wherein the circuitry is configured to continue to use the alarm until the predetermined timing after the automatic brake control has been ended regardless of a distance between the own vehicle and the target object, for which the automatic brake control has been performed, after the stoppage of the own vehicle.

3. The drive support apparatus of claim 1, wherein the predetermined timing corresponds to timing when the driver of the own vehicle performs a predetermined driving operation.

4. The drive support apparatus of claim 1, wherein the circuitry is further configured to:
   determine whether the driver of the own vehicle has performed a predetermined driving operation after the automatic brake control has been ended,
   start the alarm for the driver of the own vehicle when a probability of a crash between the own vehicle and the target object is greater than a predetermined value, and
   end the alarm when it is determined that the driver of the own vehicle has performed the predetermined driving operation.

5. The drive support apparatus of claim 4, wherein the circuitry is further configured to:
   determine whether the own vehicle is traveling or in a stopped status at the end of the automatic brake control, and
   end the alarm when it is determined by that the own vehicle is in the stopped status at the end of the automatic brake control and it is determined that the driver of the own vehicle has performed the predetermined driving operation.

6. The drive support apparatus of claim 5, wherein the circuitry is further configured to end the alarm when it is determined that the own vehicle is not in the stopped status at the end of the automatic brake control.

7. The drive support apparatus of claim 1, wherein
   the sensor detects the target object using a radar device and a camera, and
   the predetermined detection area is from a position away from the own vehicle by a first predetermined distance to a position away from the own vehicle by a second predetermined distance.

8. The drive support apparatus claim 1, wherein the alarm is a visual alarm for urging the driver of the own vehicle to perform a brake operation of the own vehicle or an acoustic alarm.

9. The drive support apparatus of claim 1, wherein after the automatic brake control is started, the circuitry is configured to end the automatic brake control when a speed of the own vehicle is less than that of the target object or the target object has gone out of the predetermined detection area.

10. The drive support apparatus of claim 1, wherein the circuitry is further configured to perform the automatic brake control when it is determined, based on a relative distance, a relative speed, and a relative acceleration value with respect to the target object that braking is necessary to prevent a crash between the own vehicle and the target object.

11. The drive support apparatus of claim 10, wherein after the automatic braking is started, the circuitry is further configured to cancel the automatic braking when the crash between the own vehicle and the target object is prevented.

* * * * *